Nov. 22, 1966   A. METSCHNABEL ETAL   3,286,919
CALCULATING MACHINE, ESPECIALLY FOUR-SPECIES
CALCULATING MACHINE
Filed Dec. 13, 1965   5 Sheets-Sheet 2
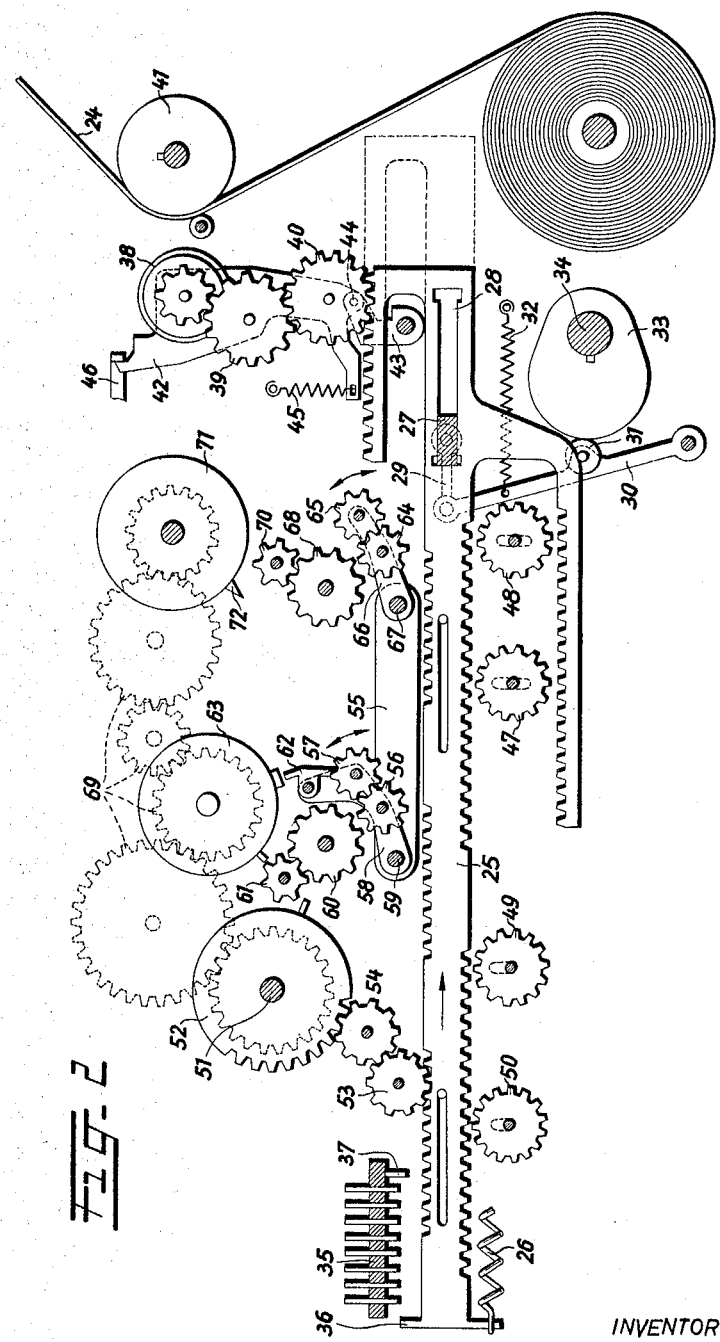
FIG-2
INVENTORS
ANDREAS METSCHNABEL
WILHELM MACHMER

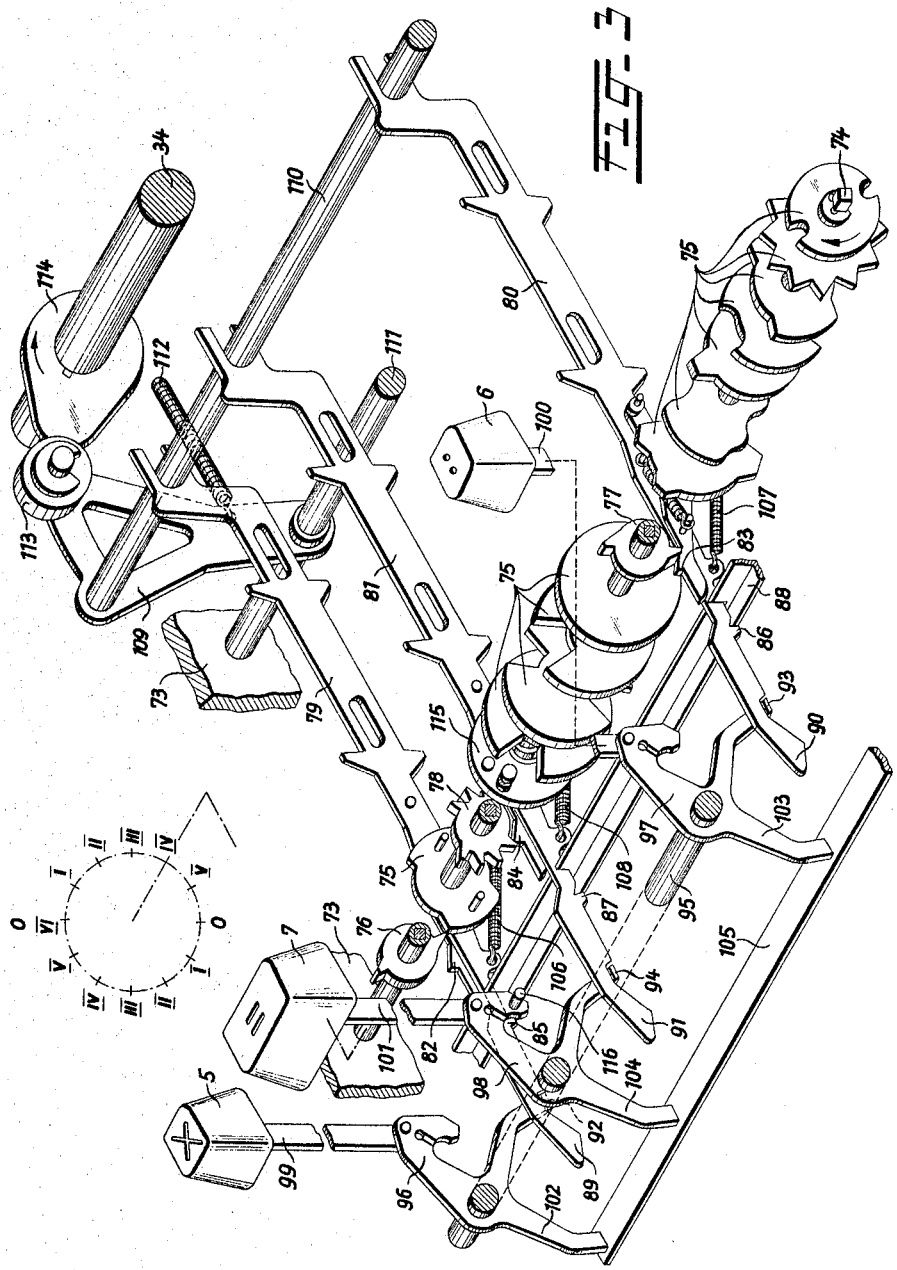

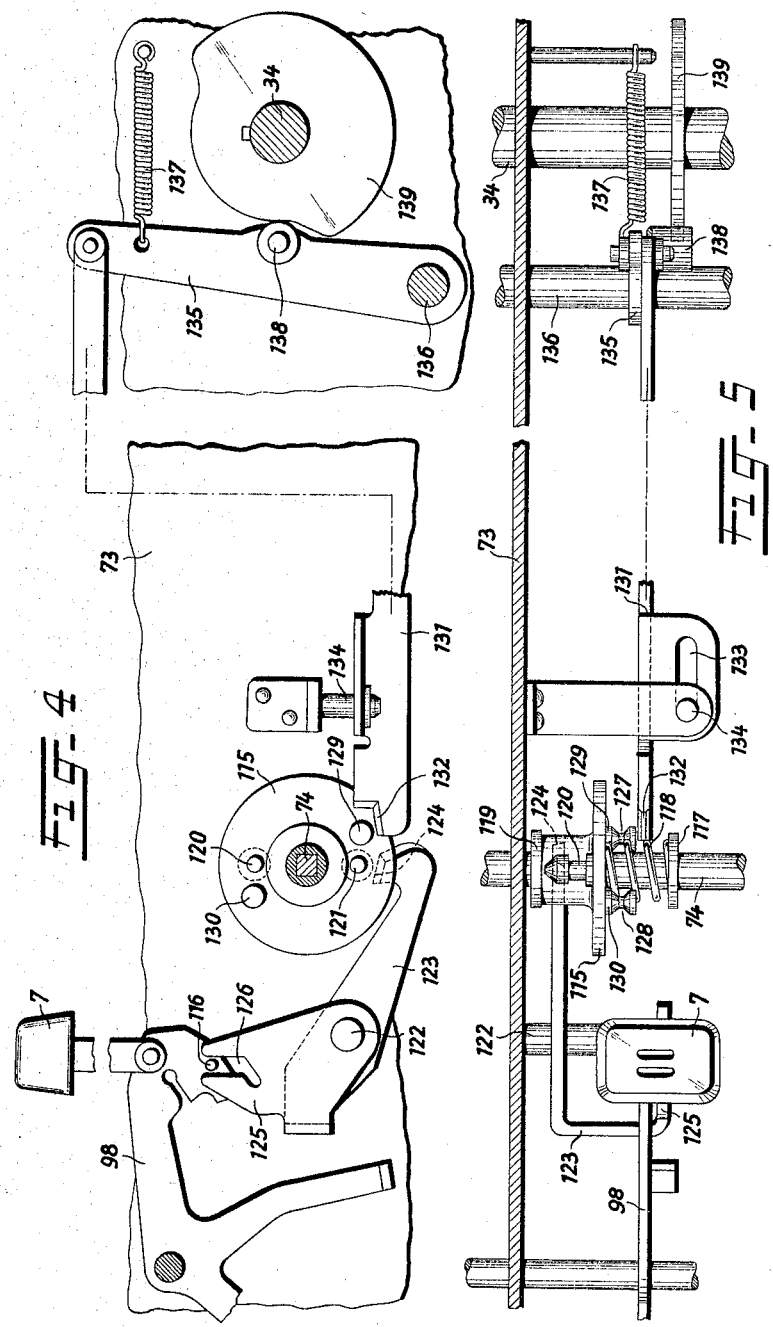

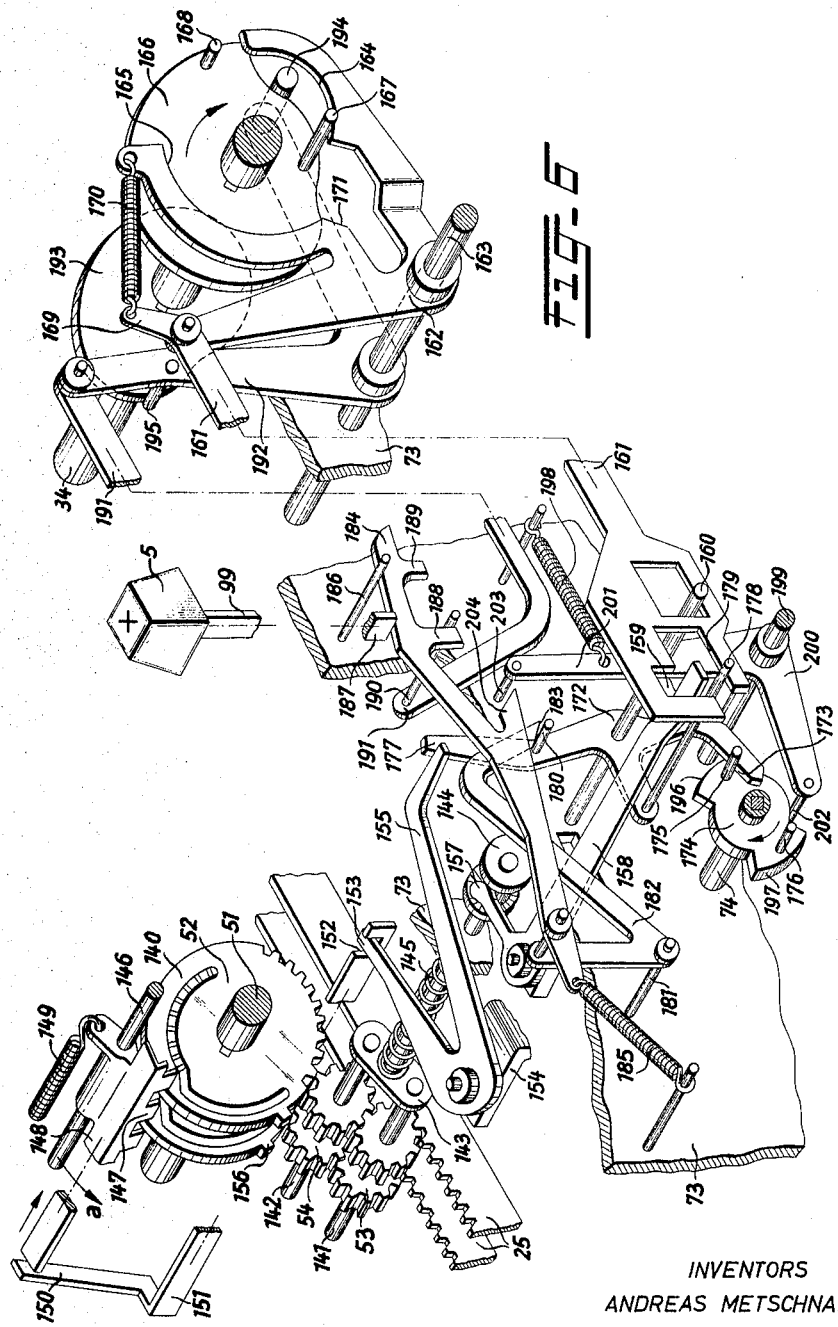
INVENTORS
ANDREAS METSCHNABEL
WILHELM MACHMER

United States Patent Office 3,286,919
Patented Nov. 22, 1966

3,286,919
CALCULATING MACHINE, ESPECIALLY FOUR-SPECIES CALCULATING MACHINE
Andreas Metschnabel, and Wilhelm Machmer, Nurnberg, Germany, assignors to Diehl, Nurnberg, Germany
Filed Dec. 13, 1965, Ser. No. 513,459
Claims priority, application Germany, Dec. 12, 1964, D 46,032
6 Claims. (Cl. 235—60)

The present invention relates to a device for use in connection with an auxiliary control arrangement serving for fully automatically carrying out multiplication and division operations in calculating machines, especially motor driven printing four-species calculating machines.

For fully automatically carrying out multiplication and division operations, calculating machines have become known which are equipped with a main counter and a revolutions counter arranged on a register carriage which is displaceable in decades. The input of values into the calculating machine is effected in a stepwise manner through the intervention of a tens keyboard and, more specifically into a pin carriage which moves into the path of movement of displaceable value transmitting racks. A printing mechanism is in continuous meshing engagement with these racks. A machine stationary register counter, the above-mentioned main counter, and the revolutions counter of the register carriage as well as one or more storage units for entering or storing values are adapted to be coupled selectively with said racks.

For purposes of carrying out a multiplication operation, the multiplicand is entered in the machine stationary register counter and the multiplier is entered in the revolutions counter arranged on the register carriage. The main counter serves in this instance for receiving the calculated product. For purposes of carrying out a division operation, the dividend is entered in the main counter and the divisor is entered in the register counter, whereas the revolutions counter receives the calculated quotient. The transfer of values from the pin carriage or one of the storage units into the calculating mechanism consisting of the main counter, the revolutions counter and the register counter, is effected by actuation of a multiplication key, a division key or a result key effecting the entry of the multiplier as well as the divisor, said transfer being effected respectively during one revolution of the main machine shaft through the intervention of the above-mentioned racks. Simultaneously, the value put into the machine is printed by a printing mechanism on tape.

Following the input of the value, the actual multiplication or division operation is effected. The multiplication operation is carried out in such a way that the multiplicand contained in the register counter is, starting with the unit of the multiplier, multiplied in a stepwise manner, and the result is stored in the main counter. The register carriage moves during this operation from its left-hand basic position in stepwise manner toward the right and is, following completion of the multiplication operation, returned to its basic or starting position for the output of the result.

With a division operation, the register carriage is first displaced from its left-hand basic position to the right to such an extent that the highest occupied digits of the main counter and the register counter are in alignment with each other. It is only then that the actual division operation consisting of subtractions and additions is effected, while the register carriage moves back into its left-hand basic position in which the output of the remainder and the quotient is effected. The printing of the product and the quotient, respectively, is carried out during a further revolution of the main machine shaft during which, in addition thereto, the main and revolutions counter are cleared and in which the result is, if desired, transferred to a recalled storage unit.

The register counter consisting of sprocket wheels is provided with a clearing device which becomes automatically effective prior to each and every entry of a value and which is driven by the main machine shaft, and is furthermore provided with a coupling device which, prior to each and every entry of a value, connects the register counter with the value transmitting elements. For the clearing device and the coupling device a common control linkage is provided which is adapted to be coupled prior to the input of a multiplicand by actuating the multiplication key with a machine actuated driving device and is adapted to be brought into working position by the latter. On the other hand, prior to the entry of a divisor said control linkage is adapted to be brought into its working position by a cam disc or by pins connected to a disc of the program control shaft. In these working positions the control linkage brings the clearing device into its operative position and couples the coupling device with a machine actuated control device for the subsequent connection of the sprocket wheels with the value transmitting members.

For fully automatically carrying out multiplication and/or division operations, a number of auxiliary operations have to be carried out in a calculating machine of this type. According to assignee's copending patent application Ser. No. 404,980, filed October 19, 1964, a program control shaft has been provided for effecting these auxiliary operations in the machine and for making the same ineffective in proper sequence. To this end, the program control shaft is provided with control cams for rendering effective and ineffective adjusting, calculating, counting and printing mechanisms as well as the driving, control, and transmitting means therefor. The program control shaft according to said patent application has fixedly connected thereto at least three advancing gears with different teeth. These advancing gears have associated therewith at least three parallelly arranged slides which are provided with spring biased control latches and which may be released individually by actuation of the function control keys. During a subsequent revolution of the main machine shaft, which will bring about the manual input or output of a value, the slides will, through the intervention of control means, carry out a stroke during which they will advance the program control shaft through the intervention of said latches in a stepwise manner and in a sequence which will bring about the proper course of the multiplication or division operation. To this end, the advance of the program control shaft is carried out in such a way that the program control shaft is advanced from its zero position once by two control steps by the first slide initiating the input of the multiplicand, and is advanced once by a further step by a second slide initiating the input of the dividend, and is advanced several times by two control steps until it reaches its zero position by subsequent release of the third slide which is arrestable in its released position up to the completion of a calculation. The third slide advances the program control shaft during the last stroke only by one step into its zero or starting position if said control shaft has been displaced at the beginning of the calculation operation by the second slide by one step only.

In view of the above, two separate programs valid for the multiplication and the division operations are, so-to-speak, combined on the program control shaft. The program control shaft passes through both programs with each calculation, however, only those control positions which are valid for the respective calculation become effective.

It is an object of the present invention to further improve the program control device described above.

It is still another object of the present invention to provide a calculating machine, especially a motor driven printing four-species calculating machine with a program control device which makes it possible so to change the program as to make possible the employment of a value already previously transferred to the register counter in a subsequent multiplication as multiplicand.

Still another object of the present invention consists in the provision of a program control device which makes it possible to omit or skip the entry of the multiplicand in a calculation program.

A still further object of the present invention consists in the provision of a program control device for a calculating machine of the above-identified type which will make it possible to enter a value keyed into the machine by a tens keyboard or recalled from a storage unit as a multiplier immediately following the starting of the machine.

It is still another object of the present invention to provide a program control device for a calculating machine, especially four-species calculating machine, which will make it possible to automatically retransfer a product calculated in the machine or a quotient into the register counter.

These and other objects and advantages of the invention will appear more clearly from the following specification in connection with the accompanying drawings, in which:

FIGURE 2 is a diagrammatic side view of the calculating machine of FIGURE 1 with the housing thereof removed, for illustrating the structure and operation of said calculating machine;

FIGURE 3 is an exploded perspective view of the program control device incorporated in the machine according to FIGURE 1;

FIGURE 4 illustrates in side view an advancing device for the program control shaft, according to the present invention;

FIGURE 5 is a top view of FIGURE 4;

FIGURE 6 is a perspective view of a device for retransferring the results calculated in the calculating machine, to the register counter.

Figure 1:
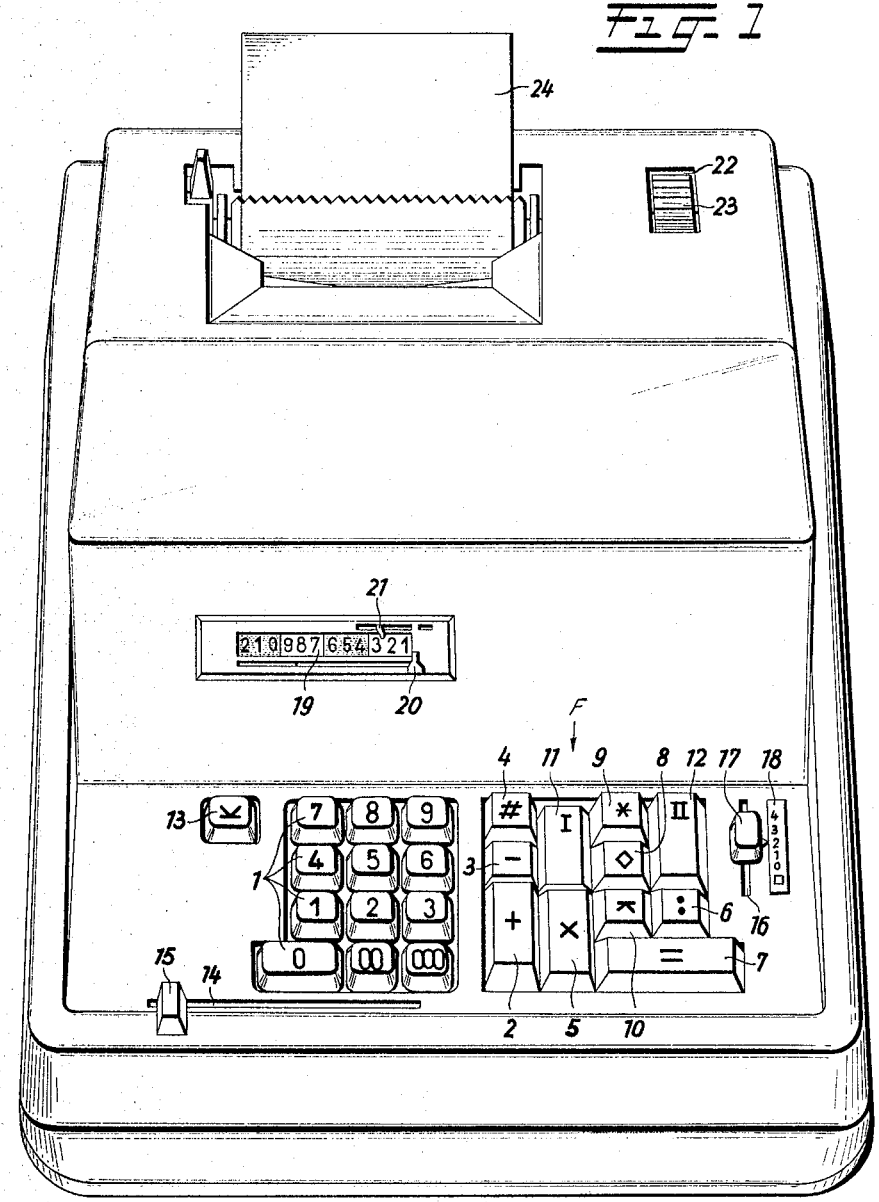
FIGURE 1 is a top view of a printing four-species calculating machine according to the invention.

The calculating machine according to the present invention is characterized primarily in that for purposes of processing previously keyed-in values, especially of values brought into the register counter by a retransfer operation, and for purposes of correcting the machine program shortened by skipping a portion of the calculating process, the program control shaft is provided with a control member adapted to be made effective by actuation of a function control key effecting the input of the multiplier and the initiation of the subsequent calculating operation. This control member is adapted to couple the program control shaft with a supplementary advancing device by means of which said program control shaft is, upon the start of the machine from its zero position, advanced immediately to the control position corresponding to the entry of the multiplier initiated by the corresponding function control key while skipping intermediate positions.

According to a further feature of the present invention, the program control shaft has mounted thereon a control disc provided with control cams. Against this control disc rests an angle lever tiltably journalled in the machine frame under the bias of a spring. Said angle lever acts with a control pin upon the control linkage provided in the machine for the input of the multiplicand and the divisor and is adapted to be titlted by said control cams. Said angle lever is adapted to couple the control linkage prior to each output of a product or a quotient with the machine actuated driving device, as is the case during the input of a multiplicand whereby upon the start of the rotation of the main machine shaft the clearing device of the register counter is moved into its effective position and whereby the coupling device connecting the register counter with the value transmitting members is coupled with the machine actuated control device and while the latter is brought into its effective position following the clearing operation.

GENERAL DESIGN OF THE CALCULATING MACHINE

Referring now to the drawings and FIG. 1 thereof in particular, the calculating machine shown therein comprises a tens keyboard 1 and a function control keyboard generally designated with the reference numeral F and located to the right of the tens keyboard with regard to FIG. 1. Function keyboard F consists of an addition key 2, a subtraction key 3, a non-calculating or numeral printing key 4, a multiplication key 5, a division key 6, a result key 7, a sub-total key 8, a grand total key 9, and a constant calling key 10. Each key is designated with a symbol indicating its function. For calling two storage units provided in the machine, the function control keyboard is equipped with two storage units selecting keys 11 and 12 which are designated with the symbols I and II. To the left of the tens keyboard 1 there is arranged a constant setting key 13 and below the tens keyboard a clearing key 15 which is displaceable in a slot 14 for manually returning a pin carriage to which values may be transferred through the intervention of the tens keyboard 1. To the right of function control keyboard F there is provided a decimal point adjusting knob 17 which is displaceable in a slot 16 for pre-adjusting a fixed decimal point. A scale 18 for reading the place of the decimal point preselected by adjusting knob 17 is located to the right of adjusting knob 17. The calculating machine according to FIG. 1 is furthermore equipped with a scale 19 above tens keyboard 1. Scale 19 in combination with a pointer 20 connected to the pin carriage serves for indicating the number of digits occupied in the pin carriage. Above scale 19 there has been provided a displaceable pointer 21 which likewise indicates the position of the decimal point preselected by knob 17. In a cutout 22 in the right-hand rear portion of the calculating machine housing there is arranged a knurled knob 23 which serves for manually advancing a transporting roller carrying a tape 24.

FIG. 2 diagrammatically illustrates in side view the arrangements for the input and output of values into the machine and the arrangements for carrying out the calculating operations in the calculating machine, however, without the control linkage pertaining thereto. The calculating machine is equipped with a number of racks 25 arranged side by side. Each of these racks 25 is held against a tensioning bar 27 by means of a spring 26 in the basic position shown in full lines in FIG. 2. Tensioning bar 27 is adapted to move towards the right with regard to FIG. 2 in a slot 28 of racks 25. Tensioning bar 27 is through the intervention of a linkage 29 pivotally connected to a lever 30 which is tiltably journalled in the calculating machine and which through the intervention of a roller 31 and a spring 32 engaging lever 30 is held against a cam disc 33 which is fixedly connected to a main machine shaft 34. As will be evident from FIG. 2, during one revolution of the machine shaft 34 tensioning bar 27 is first moved towards the right and then moved back into its starting position so that the racks 25 may through the intervention of the springs 26 engage an abutment in the position indicated in FIG. 2 in dash lines and may subsequently return to their basic or starting position.

For purposes of receiving values from a pin carriage 35, racks 25 have their front end provided with an abutment 36 by means of which they may rest against the respective adjusted pin 37 of pin carriage 35. Type wheels 38 of a printing mechanism are in continuous driving connection with the racks 25 through the intervention of transmission wheels 39, 40 so that the value received by racks 25 may be printed upon the tape 24 transported in a stepwise manner by a roller 41. Type wheels 38 and transmission wheels 39, 40 are rotatably connected to printing hammers 42 which are tiltably journalled in bolts 44 of machine stationary bearing pieces 43. Printing hammers 42 are subjected to the influence of springs 45 and are held in their ineffective position shown in FIG. 2 by arresting latches 46. Upon release of arresting latches 46, printing hammers 42 impact upon the paper roller 41 in view of the springs 45 so that depending upon the position of the typing wheels 38 one of the digits "0 to 9" may be printed.

Reference numerals 47 and 48 designate balance counters which may be made effective selectively by the selecting keys 11 and 12 and which may be brought into meshing engagement with the racks 25 by displacing the same in upward direction for addition calculations and in downward direction for subtraction calculations. Reference numeral 49 designates an auxiliary storage unit which may be made effective by the constant setting key 13 and which may be recalled by the constant calling key 10. There is furthermore provided an auxiliary storage unit 50 which may be tilted into meshing engagement with racks 25 prior to the forward movement of the latter and only following depression of a function control key without previous input of a value prior to the returning movement of racks 25. A register counter 52 which may for instance consist of sprocket wheels and which is arranged on a calculating shaft 51 may selectively be coupled to racks 25 through the intervention of laterally displaceable input wheels 53, 54. A main counter 56, 57 arranged on a displaceable register carriage 55 is provided at a frame 58 and can be tilted in downward and upward direction about round guiding means 59 which may also serve for guiding carriage 55. Main counter 56, 57 may be moved in downward direction for the input and output of values and may be moved in upward direction in order to be coupled with the register counter 52 through the intervention of machine stationary transmission gears 60, 61. During an addition calculation, the wheels 56 of main counter 56, 57 are brought into meshing engagement with the wheels 60, whereas during a subtraction calculation the reversing gears 57 are brought into meshing engagement with wheels 60 by laterally displacing the register carriage 55 by a distance corresponding to half the spacing of the digits. A tens transfer, if required, may be effected through the intervention of a tens control lever 62 and a tens transfer mechanism 63 into wheel 61 of the next higher digit.

In a manner similar to the main counter 56, 57, the revolutions counter 64, 65 is arranged in a frame 66 so as to be tiltable in upward and downward direction about round guiding means 67 in register carriage 55. For the input and output of values also revolutions counter 64, 65 is tilted in downward direction into meshing engagement with racks 25 and is tilted in upward direction into engagement with machine stationary gears 68 during the calculating process. Also in this instance either the gears 64 or 65 come into meshing engagement with gears 68, depending on whether the machine is adjusted for addition or subtraction calculations. The drive of the revolutions counter 64, 65 is effected by means of a gear transmission 69 drivingly connected to calculating shaft 51 and indicated in dot-dash lines in FIG. 2, and by means of a control tooth 72 provided on a wheel 71 and acting upon transmission gears 70.

*Program control device*

FIG. 3 illustrates the design and the operation of an auxiliary control device provided in the calculating machine according to the present invention which has been explained in detail in assignee's copending application Ser. No. 404,980 filed October 19, 1964. The auxiliary control device comprises a program control shaft 74 rotatably supported at both ends in machine frame 73. Program control shaft 74 has fixedly mounted thereon control cams 75 for rendering effective and ineffective adjusting, calculating, counting and printing mechanisms, and has also mounted thereon the driving and control means therefor. For purposes of advancing program control shaft 74 there are furthermore provided three differently toothed control gears 76, 77 and 78 on program control shaft 74, said gears 76, 77 and 78 cooperating with latches 82, 83 and 84 connected to slides 79, 80 and 81 and resiliently resting against advancing gears 76, 77 and 78. Program control shaft 74 is rotatably by 360° in twelve individual control steps. Six control steps each make up a complete program in which all auxiliary control operations required for a multiplication or division calculation are initiated. Therefore, the advancing gears 76, 77 and 78 have the same teeth and the control discs 75 have the same curvature over the second half of their circumference.

The slides 79, 80, 81 are hooked in their front or basic position to a machine stationary rail 88 by means of abutments 85, 86 and 87. They are furthermore provided with control edges 89, 90 and 91 which are engaged from underneath by bent-off extensions 92, 93 and 94 of deviating members 96, 97 and 98 tiltably arranged on a shaft 95. Deviating members 96, 97 and 98 have pivotally connected thereto shanks 99, 100 and 101 of function control keys 5, 6 and 7. In the basic or starting position the deviating members 96, 97 and 98 rest with abutments 102, 103 and 104 against a machine stationary rail 105.

By actuation of one of the function control keys 5, 6 or 7 the respective slide 79, 80 or 81 is lifted by the respective deviating member 96, 97 or 98 and is held against a tilting axis 110 connected to a tilting member 109 under the bias of a spring 106, 107 or 108. Tilting member 109 is journalled on a machine stationary shaft 111 and rests with a roller 113 against a control cam 114 of main machine shaft 34 through the intervention of a spring 112 engaging tilting member 109. Upon the start of the rotation of main machine shaft 34, tilting member 109 is released and moves with the respective released slide 79, 80 or 81 toward the rear while the respective spring-biased toothed latch 82, 83 or 84 passes by the respective advancing gear 76, 77 or 78 without displacing the same. Toward the end of the revolution of main machine shaft 34, the respective released slide 79, 80 or 81 is returned to its front or starting position by control cam 114. During this movement the respective latch 82, 83 or 84 engages the teeth of the respective advancing gear 76, 77 or 78 and advances the program control shaft 74 for the preparation of the next working step in varying step sequence, as will now be described.

Upon actuation of multiplication key 5 program control shaft 74 is, following the entry of the multiplicand, advanced by two control steps from its zero or starting position into control position II. In contrast thereto, upon actuation of division key 6, program control shaft 74 is advanced by one step only from the zero or starting position to control position I. By depressing result key 7 upon actuation of multiplication key 5, program control shaft 74 may be advanced upon entry of the multiplier from control position II to control position IV, and following the output of the product, to control position VI. By depressing result key 7 upon actuation of division key 6, program control shaft 74 is, following the entry of the divisor, advanced from control position I to control position III, and following the output of the remainder, advanced to control position V, and following the output of the quotient, returned to control position O.

As may be seen from FIG. 3, program control shaft 74 has arranged thereon a control disc 115, to be described later, and deviating member 98 of result key 7 has arranged thereon a control pin 116. Disc 115 serves for coupling program control shaft 74 to a supplementary advancing device.

Supplementary advancing device for the program control shaft

The supplementary advancing device according to the present invention serves for correcting the program of the machine if, for instance, in view of a previously effected retransfer operation the input of a value is to be omitted, if, for instance in the present case, the input of a multiplicand is to be omitted in a subsequent multiplication operation. The device operates entirely automatically and becomes effectively only if the program control shaft 74 occupies its zero position during the entry of the multiplier. The supplementary advancing device advances program control shaft 74 upon the start of the machine directly by two steps into control position II which corresponds to the entry of the multiplier.

FIGS. 4 and 5 illustrate a portion of program control shaft 74. Program control shaft 74 has mounted thereon disc 115 which is axially displaceable to a limited extent but is not rotatable. According to FIG. 5, disc 115 is in its resting position pressed against a limiting disc 119 fixedly connected to program control shaft 74 by means of a pressure spring 118 the other end of which rests against an abutment 117. One end face of disc 115 is provided with two control pins 120, 121 which are offset by 180° and which have conical engaging surfaces. Control pins 120, 121 cooperate with a U-shaped control lever 123 which is tiltably journalled on a machine stationary shaft 122 and which is provided with a hook-shaped control edge 124. Control edge 124 is in the zero position of the machine located underneath one of the pins 120, 121 and outside the range of rotation of the latter. Control lever 123 is provided with an upwardly directed arm 125 having a slot 126 which straddles pin 116 of deviating member 98 of result key 7.

By actuation of result key 7 deviating member 98 is rotated in clockwise direction and pin 116 is displaced in recess 126 in downward direction and thereby simultaneously rotates lever 123. In this way control edge 124 is displaced into the range of movement of pins 120, 121. If program control shaft 74 occupies its zero or starting position, control edge 124 engages the conically-shaped end of pin 120 or 121 located in the range of movement of edge 124 and displaces disc 115 in axial direction against the thrust of spring 118.

That end face of control disc 115 which is located opposite pins 120, 121 is provided with two coupling pins 129, 130 which are offset by 180° with regard to each other and which are provided with annular grooves 127, 128. One of the pins 129, 130 will extend into the range of movement of a rod 131 in the zero position of the program control shaft 74 if disc 115 has been displaced in axial direction. Rod 131 has its free end provided with a control edge 132 and is displaceably journalled on a bolt 134 fixedly connected to machine frame 73 in view of the provision of an oblong hole 133. Control rod 131 has its right-hand end with regard to FIG. 5 pivotally connected to a roller lever 135.

Roller lever 135 is pivotable about a machine stationary shaft 136 and rests under the thrust of a spring 137 connected thereto and to frame 73 with a roller 138 against a cam disc 139 of main machine shaft 34. During each revolution of main machine shaft 34 rod 131 is moved toward the front (toward the left with regard to FIGS. 4 and 5). If, during this movement the program control shaft 74 occupies its zero position and disc 115 occupies its coupled position, control edge 132 of rod 131 engages the annular groove 127 or 128 of the respective coupling pin 129 or 130 and rotates program control shaft 74 by two steps into control position II. In this way, the control position O controlling the input of the multiplicand does not become effective and the value keyed into the machine or recalled from a storage unit is directly entered as multiplier into the revolutions counter 64, 65. Toward the end of the revolution of main machine shaft 34 effecting the input of the multiplier, slide 81 pertaining to result key 7 and described in connection with FIG. 3 is brought into its front or basic position and thereby advances program control shaft 74 by two further steps into control position IV whereby the output of the product will be prepared and the normal control rhythm resumed.

Further below it will be described how an automatic retransfer of a product calculated in the machine or a quotient into the register counter may be effected in a very simple manner. For this purpose, the structure of the register counter and the device for actuating the same during the input of a multiplicand or a divisor will now be described.

Device for actuating the register counter

FIG. 6 shows a portion of calculating shaft 51 with some of the sprocket wheels 140 of register counter 52. Underneath sprocket wheels 140, input wheels 53, 54 are rotatably journalled on shafts 141, 142. Wheels 53 are in continuous meshing engagement with the value transmitting racks 25. Shafts 141, 142 are fixedly connected to a frame 143 which is axially displaceable in machine frame 73 and the right-hand end of which carries a roller 144 provided with an annular groove. Frame 143 is held in its left-hand basic or rest position by a pressure spring 145. Upon displacement of frame 143 toward the right, the somewhat broader wheels 53 remain in meshing engagement with racks 25, whereas wheels 54 will mesh with the teeth of sprocket wheels 140. In this way, register counter 52 may be coupled with racks 25 for the input of a value.

Above sprocket wheels 140 there is arranged a shaft 146 which is tilted once in the direction of the arrow $a$ during each revolution of the main machine shaft 34 over approximately one-third of the circumference of the sprocket wheels 140 through the intervention of a control device known per se and not shown in FIG. 6. A clearing flap 148 provided with noses 147 is axially displaceably mounted on shaft 146. In its left-hand rest position flap 148 rests against a bent-off arm 150 of a rail 151 displaceably journalled in the calculating machine, under the influence of a spring 149 connected to a tiltable frame (not shown). An arm 153 of an angle lever 153, 155 which is tiltably arranged on an angled piece 154 of machine frame 73, rests in a cutout 152 of rail 151.

By tilting angle lever 153, 155 in clockwise direction, flap 148 is, through the intervention of rail 151, moved toward the right to such an extent that the noses 147 are located above sprocket wheels 140. At the beginning of a revolution of main machine shaft 34, shaft 146 with flap 148 will be tilted toward the front whereby the noses 147 will move the sprocket wheels having stored therein a value into their zero position through the intervention of abutments 156 provided on sprocket wheels 140. Subsequently, shaft 146 will be tilted back into its basic position shown in FIG. 6.

Register counter 52 has to be cleared prior to each entry of a multiplicand in the zero position of program control shaft 74, and prior to each entry of a divisor in control position I of program control shaft 74, and has subsequently to be coupled with the racks 25 during an advancing movement of the latter. This operation is effected by means of a device shown in FIG. 6 which is prepared for the entry of a multiplicand by actuation of the multiplication key 5 and for the entry of a divisor by program control shaft 74 and which is released by main machine shaft 34.

An arm 157 of an angle lever 157, 158 journalled in machine frame 73 engages roller 144 of frame 143. Arm 158 of angle level 157, 158 extends into a stepped cutout 159 of a coupling rod 161 which is displaceable and tiltable to a limited extent on a machine stationary shaft 160 and which has its rearwardly extending end pivotally connected to a control level 162. Control lever 162 is tiltably journalled on a machine stationary shaft 163 and is provided with two control edges 164, 165 which are laterally offset with regard to each other and which cooperate with two pins 167, 168, which are connected to one end face of a cam disc 166 provided on main machine shaft 34, said pins 167, 168 being of different length. Control level 162 rests in its basic or rest position with its control edge 164 against pin 167 in view of the thrust of a spring 170 engaging control lever 162 and an extension 169 of coupling rod 161, whereas coupling rod 161 has its front end tilted in upward direction.

During each revolution of main machine shaft 34 pin 167 slips off control edge 164 of control lever 162 while the latter is tilted into an intermediate position by means of spring 170. After approximately half a revolution of main machine shaft 34, pin 168 engages inclined edge 171 of control edge 165 and tilts control lever 162 into its operative or effective position whereby coupling rod 161 is moved toward the front. If coupling rod 161 is tilted in downward direction by means to be described further below, rod 161 straddles lever arm 158 of lever 157, 158 by means of cutout 159. In this way lever 157, 158 is tilted and frame 143 is brought into its coupled position. Toward the end of the revolution of main machine shaft 34, pin 168 slips off control edge 165 of control lever 162 and the latter returns to its intermediate position. Subsequently, lever 162 is returned to its rest position by pin 167 and thereby register counter 52 uncoupled.

A lever 172 tiltably journalled on shaft 160 extends with a control edge 173 into the range of movement of pins 175, 176 provided in a disc 174 of program control shaft 74. Furthermore, lever 172 is provided with an arm 177 extending in upward direction and with a control pin 178. Upon each entry of a dividend, program control shaft 74 is moved into control position I for the entry of a divisor, as has been decsribed above. For this purpose, one of the control pins 175, 176 engages the control edge 173 and thereby tilts lever 172 in counter-clockwise direction. Control pin 178 thereby enages an edge 179 of coupling rod 161 and tilts the latter in downward direction into its operative position, whereas arm 177 engages lever 153, 155 and displaces the same into operative position together with the clearing device described above. Following the input of the divisor, by the advance of the program control shaft into control position III, the release and return of lever 172 to its basic or rest position is effected, coupling rod 161 is released, and the clearing device is displaced into its ineffective position.

Also during the input of the multiplicand the control of register counter 52 is effected by the tilting movement of lever 172. This movement is initiated by actuation of multiplication key 5 since control shaft 74 occupies its zero or starting position and is carried out by a driving device provided in the machine. To this end, lever 172 has one side thereof provided with a pin 180 against which loosely rests a control lever 182 with a control edge 183, said control lever 182 being tiltably journalled on a machine stationary bolt 181. Control lever 182 has rotatably provided thereon a control rod 184. Under the influence of a spring 185 connected to control rod 184 and machine frame 73, control rod 184 rests in its basic position against an abutment 186 of machine frame 73 whereby also the basic position of control lever 182 is determined. The free end of control rod 184 is engaged by an extension 187 of the key shaft 99 of multiplication key 5. By depression of multiplication key 5, control rod 184 is adapted to be tilted and straddles with two abutments 188, 189 a control pin 190 of a driving device controlling several functions of the calculating machine according to the invention. Through the intervention of control pin 190 control rod 184 is approximately horizontally displaceable toward the rear whereby control lever 182 is tilted and whereby it acts with its control edge 183 on pin 180 and displaces lever 172 into its operative position.

The structure of the driving device mentioned above is as follows: Pin 190 is connected to a push-rod 191 and rests in its basic position against abutment 188. The rearward end of push-rod 191 is pivotally connected with a roller lever 192 rotatably journalled on shaft 163. Roller lever 192 is positively tiltable by cam disc 166 and a further cam disc 193 of main machine shaft 34 through the intervention of pins or rollers 194, 195. In this way, with each revolution of main machine shaft 34, a stroke is imparted upon push-rod 191 and the register counter is prepared for the input of a value if control rod 184 is coupled.

*Retransfer of a result*

For the retransfer of a calculated product or a quotient into register counter 52, the same control functions are to be performed as with the input of a value, however, they have to be effected at different times. For this purpose, in conformity with a further feature of the present invention, program control shaft 74 is provided with disc 174 which comprises two cams 196, 197. Disc 174 is engaged by a bolt 202 of an angle lever 200, 201 which is tiltably journalled on a machine stationary shaft 199, under the influence of a spring 198. Arm 201 of angle lever 200, 201 has laterally connected thereto a control pin 203 which in the basic position loosely rests against a control edge 204 of control rod 184. In the control positions IV and V of program control shaft 74, angle lever 200, 201 is rotated in counter-clockwise direction, control pin 203 slides along control edge 204 and moves control rod 184 into coupled position in the same manner as previously described in connection with the input of a multiplicand. Upon further advance of program control shaft 74 to its zero or starting position, all other elements are likewise returned.

It is, of course, to be understood, that the present invention is, by no means, limited to the particular constructions shown in the drawings, but also comprises any modifications within the scope of the appended claims.

What is claimed is:

1. A motor driven four species calculating machine having digit input keys and function keys including at least multiplication, division, and result keys, a main drive shaft rotatable through a single rotation for each operation of the machine, a program control shaft having control cams thereon and indexable for controlling the operation of said machine, said control shaft having a zero position and a plurality of indexed positions, at least three differently toothed advancing gears on said control shaft for effecting indexing movement thereof, a slide for each advancing gear, each slide having a tooth for engagement of the pertaining advancing gear in one direction of movement only of the slide, said slides being normally latched in ineffective positions and being operable when released to reciprocate upon each revolution of said main drive shaft and moving in said one direction during the latter portion of the rotary movement of said main drive shaft, means under the control of said multiplication, division and result keys for releasing respective ones of said slides from latched position upon activation of said keys, each slide being effective when reciprocable to act through its pertaining advancing gear to index said control shaft a different amount, and auxiliary advancing means operable for indexing said control shaft from its starting or zero position to an intermediate position independently of said slides, said auxiliary means being connected with said result key so as to be made effective thereby upon the entry of a multiplier by actuation of the result key and being operable during that portion of the rotation of the main drive shaft preceding the said latter portion thereof.

2. A calculating machine according to claim 1 in which said auxiliary advancing means comprises a control member on said control shaft normally in ineffective position, a reciprocable member actuated by said main drive shaft when the latter rotates, and means operated by said result key for moving said control member into effective position when said control shaft is in a predetermined indexed position.

3. A calculating machine according to claim 2 in which said reciprocable member is a control slide, a lever connected to said control slide and pivoted in said machine, a cam on the main drive shaft engaging said lever, said control slide having a surface at one end to abut said control member on said control shaft and index the said control member and said control shaft while permitting further indexing of the control shaft by the pertaining one of said first mentioned slides.

4. A calculating machine according to claim 3 in which said control member is a disc axially displaceable on said control shaft but non-rotatable thereon, pins with conical end parts on one side of said disc, spring means biasing said disc on said control shaft toward said one side of said disc, a control lever connected to said result key for actuation thereby engageable with one of said pins in the zero position of said control shaft for moving the disc on the control shaft against the bias of said spring means, and coupling pins on the other side of the disc moveable into the path of said control slide by the said movement of the disc on said control shaft.

5. A calculating machine according to claim 3 in which said machine includes a counter register for receiving a multiplicand and divisor, a clearing device for clearing said register counter prior to each input thereto, a coupling device for coupling said register counter to the value transmitting members controlled by the digit keys of the machine, a control linkage sequentially actuating said clearing device and said coupling device and adapted to be moved into working position for coupling with a machine actuated driving device for actuation thereof, first means operated by said multiplication key prior to the entry of a multiplicand for moving said control linkage into working position, second means operated by said control shaft in a predetermined indexed position thereof prior to the entry of a divisor for moving said control linkage into working position, said control linkage when actuated first moving said clearing device into operative position and secondly coupling said coupling device with a machine actuated control device for the subsequent coupling of said counter register with said value transmitting members.

6. A calculating machine according to claim 5 in which said first and second means comprises cam means on said control shaft, a pivoted angle lever having one end biased against said cam means, a pin on the other end of said angle lever, said control linkage including a link engaging said pin on the angle lever and said multiplication key for actuation thereby, said link when actuated by either of said pin on the angle lever and said multiplication key coupling said control linkage to a machine driven element whereby upon start of the rotation of said main drive shaft said clearing device is moved into operative position, and said coupling device is coupled with said machine actuated control device whereby said coupling device is moved into operative position by said machine actuated device after the clearing operation.

References Cited by the Examiner

UNITED STATES PATENTS

| | | | |
|---|---|---|---|
| 3,024,975 | 3/1962 | Sundstrand | 235—60 |
| 3,079,073 | 2/1963 | Heinze et al. | 235—60.15 |
| 3,145,923 | 8/1964 | Chall | 235—60 |

FOREIGN PATENTS

| | | |
|---|---|---|
| 1,157,011 | 11/1963 | Germany. |
| 1,170,686 | 5/1964 | Germany. |

RICHARD B. WILKINSON, *Primary Examiner.*